United States Patent
Cao et al.

(10) Patent No.: US 12,047,934 B2
(45) Date of Patent: Jul. 23, 2024

(54) VEHICLE-INITIATED APPROACH TO JOINING A GROUP

(71) Applicant: QUALCOMM Incorporated, San Diego, CA (US)

(72) Inventors: Yiqing Cao, Beijing (CN); Wanshi Chen, San Diego, CA (US); Yan Li, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 450 days.

(21) Appl. No.: 17/280,839

(22) PCT Filed: Sep. 10, 2019

(86) PCT No.: PCT/CN2019/105037
§ 371 (c)(1),
(2) Date: Mar. 26, 2021

(87) PCT Pub. No.: WO2020/063322
PCT Pub. Date: Apr. 2, 2020

(65) Prior Publication Data
US 2022/0007379 A1     Jan. 6, 2022

(30) Foreign Application Priority Data
Sep. 28, 2018 (WO) ................ PCT/CN2018/108430

(51) Int. Cl.
*H04W 72/121*     (2023.01)
*H04W 4/40*     (2018.01)
(Continued)

(52) U.S. Cl.
CPC .......... *H04W 72/121* (2013.01); *H04W 4/40* (2018.02); *H04W 72/02* (2013.01); *H04W 72/0466* (2013.01)

(58) Field of Classification Search
CPC ..... H04W 72/121; H04W 4/40; H04W 72/02; H04W 72/0466
See application file for complete search history.

(56) References Cited

U.S. PATENT DOCUMENTS

| | | |
|---|---|---|
| 2005/0128104 A1 | 6/2005 | Karabinis |
| 2007/0088494 A1 | 4/2007 | Rothman et al. |

(Continued)

FOREIGN PATENT DOCUMENTS

| | | |
|---|---|---|
| CN | 105702018 A | 6/2016 |
| CN | 106408930 A | 2/2017 |

(Continued)

OTHER PUBLICATIONS

English translation of CN 107464436, 15 pages, 2023 (Year: 2023).*

(Continued)

*Primary Examiner* — Won Tae C Kim
(74) *Attorney, Agent, or Firm* — Loza & Loza LLP

(57) ABSTRACT

Aspects of the disclosure relate to mechanisms and algorithms for a vehicle to join a vehicle group. The vehicle may transmit a query message that includes an identifier, and includes vehicle course information. In response, the vehicle may receive an invitation message that includes a group identifier, group course information, and wireless resource information for joining a vehicle group. The vehicle may then transmit a joining request message, including the first group identifier.

23 Claims, 11 Drawing Sheets

(51) Int. Cl.
*H04W 72/02* (2009.01)
*H04W 72/044* (2023.01)

(56) References Cited

U.S. PATENT DOCUMENTS

| | | | |
|---|---|---|---|
| 2008/0162935 A1* | 7/2008 | Ginzboorg | H04L 9/0822 713/170 |
| 2012/0249343 A1 | 10/2012 | Thomas | |
| 2013/0013181 A1 | 1/2013 | Wang et al. | |
| 2015/0356795 A1 | 12/2015 | Warren | |
| 2017/0158196 A1 | 6/2017 | Park et al. | |
| 2017/0188321 A1* | 6/2017 | Matsumoto | H04W 56/0065 |
| 2018/0113448 A1 | 4/2018 | Nagda et al. | |
| 2018/0143649 A1 | 5/2018 | Miao et al. | |
| 2018/0176785 A1* | 6/2018 | Chuang | H04W 16/10 |
| 2018/0227882 A1* | 8/2018 | Freda | H04W 8/005 |
| 2018/0278385 A1 | 9/2018 | Wu et al. | |
| 2019/0073909 A1* | 3/2019 | Neubecker | B60Q 1/143 |
| 2020/0092685 A1* | 3/2020 | Fehrenbach | H04W 72/23 |
| 2021/0212023 A1* | 7/2021 | Zeng | H04W 72/121 |

FOREIGN PATENT DOCUMENTS

| | | | |
|---|---|---|---|
| CN | 107464436 | * | 12/2017 |
| CN | 107464436 A | | 12/2017 |
| WO | 2016206465 A1 | | 12/2016 |
| WO | 2017032100 A1 | | 3/2017 |
| WO | 2017133624 A1 | | 8/2017 |

OTHER PUBLICATIONS

3GPP document R1-1808601 entitled "Vehicle platooning use case in NR V2X", InterDigital Inc., Aug. 20-24, 2018, pp. 1-2. (Year: 2018).*
International Search Report and Written Opinion—PCT/CN2018/108430—ISA/EPO—Jun. 28, 2019.
International Search Report and Written Opinion—PCT/CN2019/105037—ISA/EPO—Nov. 28, 2019.
Qualcomm Inc, "Completing V2X Platooning Communications Requirements", 3GPP TSG-SA WG1 Meeting #76, S1-163304-WAS163139-Platooning-Unicast, 3rd Generation Partnership Project (3GPP), Nov. 12, 2016 (Nov. 12, 2016), XP051199108, 4 Pages, Retrieved from the Internet: URL: http://www.3gpp.org/ftp/tsg_sa/WG1_Serv/TSGS1_76_Tenerife/Docs/ [Retrieved on Nov. 12, 2016] section 5.5.1.3 "Service Flows".
Supplementary European Search Report—EP19868098—Search Authority—The Hague—May 24, 2022.
3GPP: "3rd Generation Partnership Project, Technical Specification Group Services and System Aspects, Study on Enhancement of 3GPP Support for 5G V2X Services (Release 15)", 3GPP TR 22.886 V2.0.0, Dec. 2016, pp. 1-57.

* cited by examiner

VEHICLE-INITIATED APPROACH TO JOINING A GROUP

CROSS-REFERENCE TO RELATED APPLICATION(S)

This application is the U.S. national stage of PCT patent application number PCT/CN2019/105037 filed on Sep. 10, 2019, which claims priority to and the benefit of PCT patent application number PCT/CN2018/108430 filed on Sep. 28, 2018, the content of each of which is incorporated herein by reference.

TECHNICAL FIELD

The technology discussed below relates generally to wireless communication networks, and more particularly, to vehicle-based wireless communication.

INTRODUCTION

Vehicle-to-Everything (V2X) communication involves the wireless exchange of information not only between vehicles themselves, but also between vehicles and external systems, such as streetlights, buildings, pedestrians, and wireless communication networks. V2X systems enable vehicles to obtain information related to the weather, nearby accidents, road conditions, activities of nearby vehicles and pedestrians, objects nearby the vehicle, and other pertinent information that may be utilized to improve the vehicle driving experience and increase vehicle safety.

Enhanced V2X (eV2X) wireless communication extends V2X to support the transport of V2X messages with varying performance requirements, including advanced driving (semi-automated or fully-automated driving), extended sensors, remote driving, and vehicle platooning. Platooning refers to the operation of a group of vehicles in a closely linked manner, where the vehicles move like a train with virtual strings attached between them. Vehicles capable of platooning can dynamically form a group to travel together, exchanging signals with one another for platooning operations. By virtue of platooning, fuel consumption can be reduced, the distance between vehicles can be reduced, and fewer drivers may be required. Vehicles in a platoon maintain the distance between them by sharing status information with one another, such as their course, speed, heading, and intentions such as braking, acceleration, etc.

To support platooning, vehicles may exchange information with one another about their intent or interest to form a platoon, their intention to join an existing platoon, their intention to be a leader or follower within a platoon, and their intention to leave a platoon. Within a platoon, several messages may be exchanged among the group of vehicles for platoon management. Furthermore, once a platoon is formed and operational, a vehicle that does not belong to the platoon should be made aware of the existence of the platoon. Thus, a platoon may communicate a suitable announcement or warning message about its presence. In this way, a vehicle that does not belong to a platoon can avoid inadvertently moving into the middle of the platoon or otherwise disrupting the operation of the platoon.

As the demand for vehicle-based wireless communication increases, research and development continue to advance applicable technologies not only to meet the growing demand for vehicle-based wireless communication, but also to possibly advance and enhance the automated vehicle driving experience.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example a method for a wireless communication device (e.g., a vehicle that is configured to support vehicle-based wireless communication) to join a group or platoon is disclosed. The method includes transmitting a query message, which includes an identifier (e.g., a vehicle ID and/or group ID) and vehicle course information. The method further includes receiving an invitation message in response to the query message. The response message includes a first group ID, first group course information, and wireless resource information for joining a first vehicle group. The method then includes transmitting a joining request message in response to the invitation message. The joining request message includes the first group ID of the first vehicle group.

In another example, a method for a group leader within a vehicle group is disclosed. The method includes receiving a query message from a vehicle, where the query message includes a vehicle ID (and/or a group ID) and vehicle course information. The method further includes determining whether to invite the vehicle to join the vehicle group, and if so, transmitting an invitation message to the vehicle. The invitation message includes a group ID, group course information, and wireless resource information for joining the vehicle group. The method further includes receiving a joining request message from the vehicle in response to the invitation message. The joining request message includes at least the group ID.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
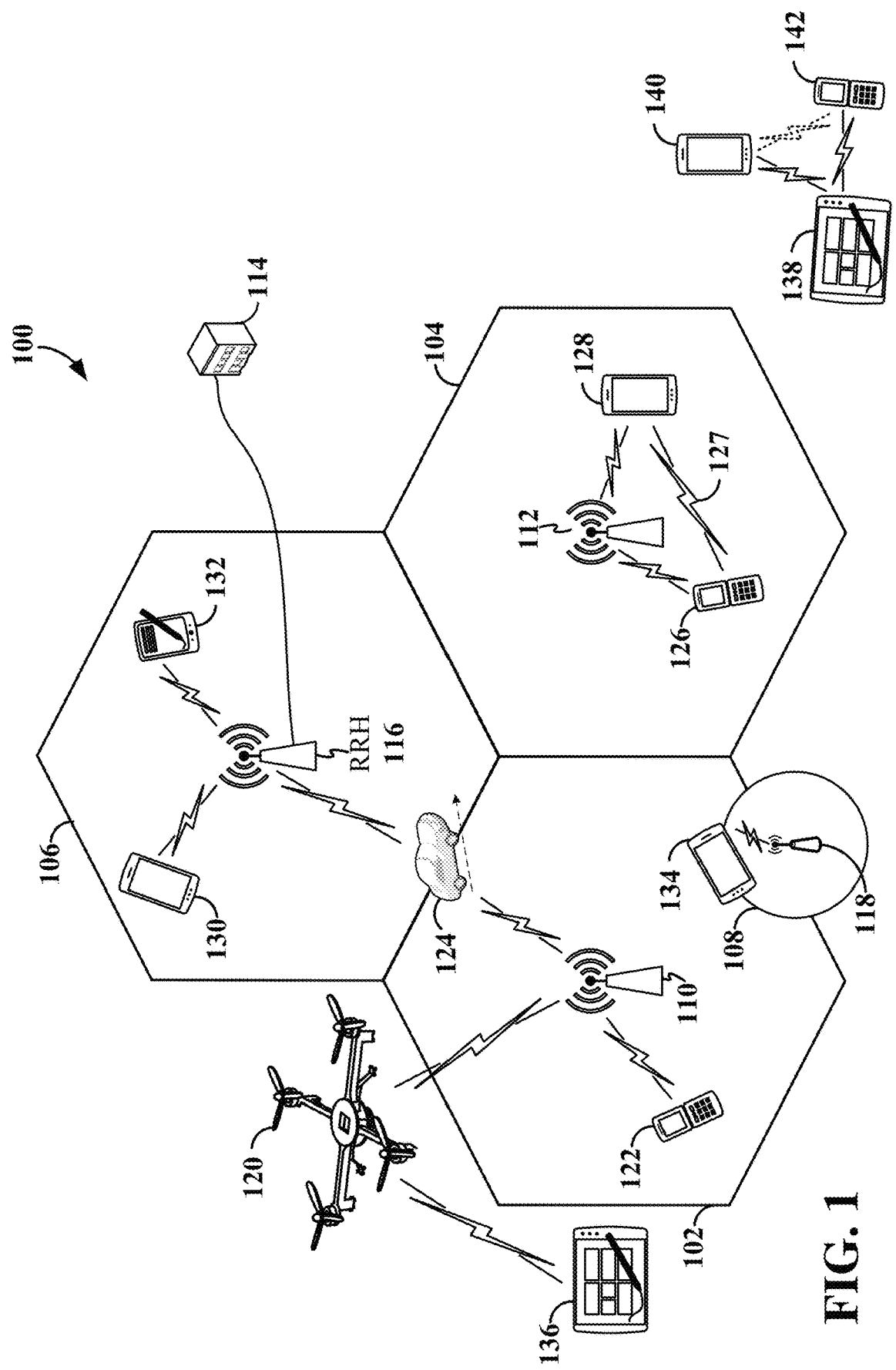
FIG. 1 is a diagram illustrating an example of a wireless radio access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

As briefly discussed above, a group of vehicles capable of enhanced vehicle-to-everything (eV2X) communication, when traveling together can dynamically form a platoon. When the platoon is formed, vehicles within the platoon wirelessly communicate with one another. For example, a leading vehicle may periodically send data to others within the platoon relating to platoon operations. By virtue of platooning, the distance between vehicles can become very small. Accordingly, communication signals between vehicles in the platoon may generally be low-power signals with limited range.

When vehicles utilize platooning, a vehicle that does not belong to a platoon should be made aware of the existence of the platoon. In this way, the vehicle can avoid disrupting the operation of the platoon, for example, by inadvertently moving into the middle of the platoon. To support this function, the platoon may communicate a suitable announcement or warning message, at a communication range beyond that of communications among vehicles within the same platoon.

However, in many instances vehicle-based wireless communications, such as, e.g., V2X communications, may utilize a half-duplex communication scheme. That is, the radio used for V2X communications may only support wireless communications in one direction at any given time. Thus, if a vehicle is transmitting a message, it may miss any other messages that happen to be transmitted at the same time since its receiver may not function at the same time as its transmitter. Due to such half-duplex operations, or for any other reason, a given vehicle may fail to properly receive and decode a platoon's announcement or warning messages. Similarly, during the time that it is transmitting its announcement or warning messages, a platoon may fail to properly receive and decode communications from a vehicle about its intention to join the platoon. Therefore, there exists a need for a reliable mechanism for communication between a vehicle and a platoon during the time that the vehicle approaches and joins the platoon.

Accordingly, various aspects of the present disclosure provide for a robust approach for a vehicle to join a platoon even when utilizing a half-duplex radio.

The various concepts presented throughout this disclosure may be implemented across a broad variety of telecommunication systems, network architectures, and communication standards. Referring now to FIG. 1, as an illustrative example without limitation, a schematic illustration of a radio access network (RAN) 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eU-TRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station serves each cell. Broadly, a base station is a network element in a RAN responsible for radio transmission and reception in one or more cells to or from a UE. In different technologies, standards, or contexts, a base station may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the RAN 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the present disclosure, two or more UE (e.g., UEs 126 and 128) may communicate with each other using peer to peer (P2P) or sidelink signals 127 without relaying that communication through a base station (e.g., base station 112).

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Unicast or broadcast transmissions of control information and/or traffic information (e.g., user data traffic) in a direction from a base station (e.g., base station 110) to one or more UEs (e.g., UEs 122 and 124) may be referred to as downlink (DL) transmissions. On the other hand, transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), single-carrier frequency division multiple access (SC-FDMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FUM), orthogonal frequency division multiplexing (OFDM), sparse code multiplexing (SCM), single-carrier frequency division multiplexing (SC-FDM) or other suitable multiplexing schemes.

Further, the air interface in the RAN 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the RAN 100 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as scheduling entities. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE, which may be stationary, may function as a scheduling entity in a device-to-device (D2D), peer-to-peer (P2P), or vehicle-to-vehicle (V2V) network, a vehicle-to-everything (V2X), enhanced V2X (eV2X) and/or in a mesh network. In a mesh network example, UEs 140 and 142 may optionally communicate directly with one another in addition to communicating with the scheduling entity 138.

Two examples of technologies that may be used by V2X networks include dedicated short range communication (DSRC) based on IEEE 802.11p standards, and cellular V2X based on LTE and/or 5G (New Radio) standards. Various aspects of the present disclosure may relate to New Radio (NR) cellular V2X or eV2X networks, referred to herein as V2X networks for simplicity. In some examples, V2X communications may be enabled by sidelink communications scheduled by a roadside unit (RSU), which may be, for example, a stationary UE operating as a scheduling entity for V2X communication. However, it should be understood that the concepts disclosed herein may not be limited to a particular V2X standard.

Figure 2:
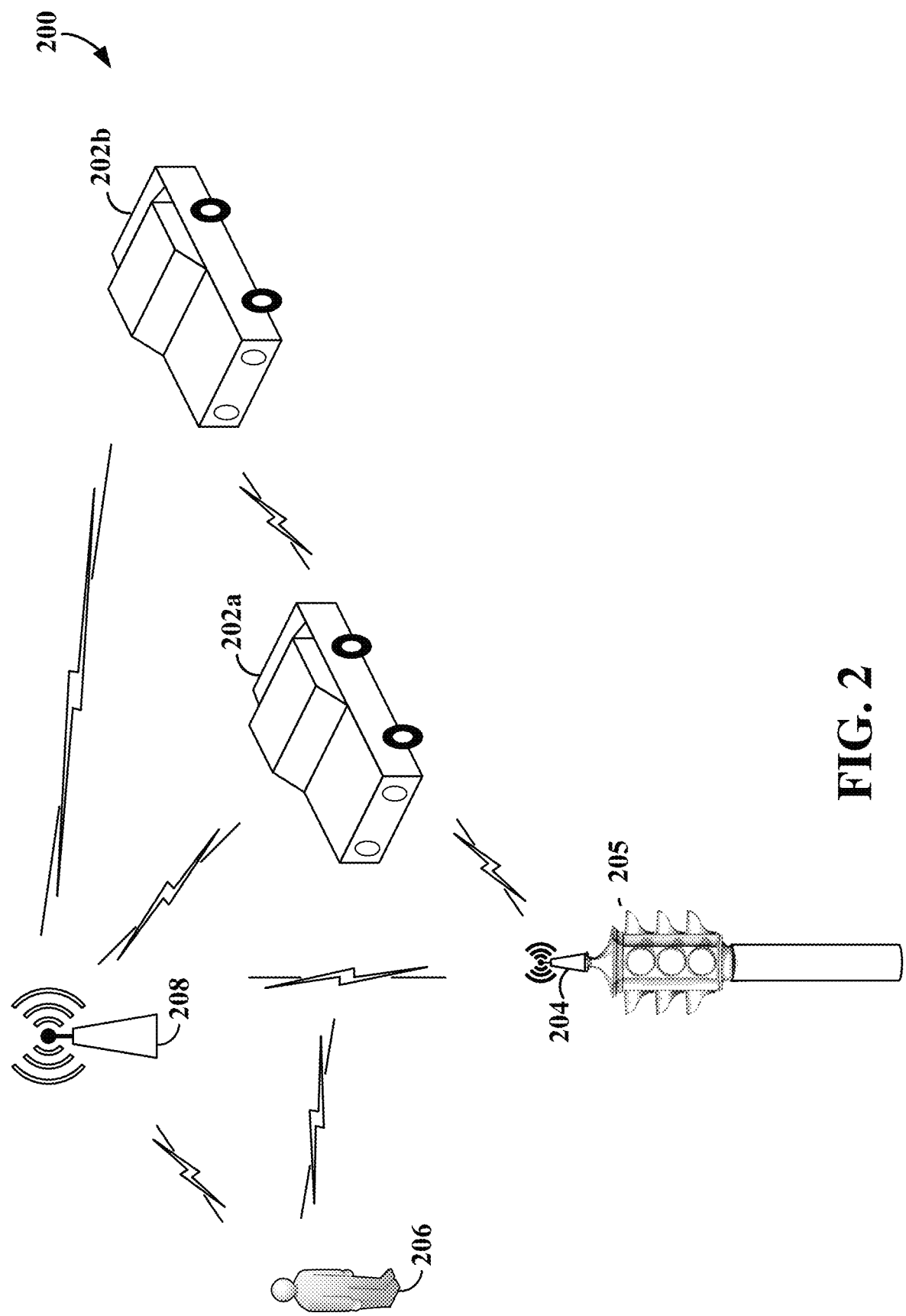
FIG. 2 is a diagram illustrating an example of a vehicle-based wireless communication network.

FIG. 2 illustrates an example of a vehicle-to-everything (V2X) wireless communication network 200. A V2X network can connect vehicles 202a and 202b to each other (vehicle-to-vehicle (V2V)), to roadway infrastructure 204/205 (vehicle-to-infrastructure (V2I)), to pedestrians/cyclists 206 (vehicle-to-pedestrian (V2P)), and/or to the network 208 (vehicle-to-network (V2N)).

A V2I transmission may be between a vehicle (e.g., vehicle 202a) and a roadside unit (RSU) 204, which may be coupled to various infrastructure 205, such as a traffic light, building, streetlight, traffic camera, tollbooth, or other stationary object. The RSU 204 may act as a base station enabling communication between vehicles 202a and 202b, between vehicles 202a/202b and the RSU 204 and between vehicles 202a/202b and mobile devices 206 of pedestrians/cyclists. The RSU 204 may further exchange V2X data gathered from the surrounding environment, such as a connected traffic camera or traffic light controller, V2X connected vehicles 202a/202b, and mobile devices 206 of pedestrians/cyclists, with other RSUs 204 and distribute that V2X data to V2X connected vehicles 202a/202b and pedestrians 206. Examples of V2X data may include status information (e.g., position, speed, acceleration, trajectory, etc.) or event information (e.g., traffic jam, icy road, fog, pedestrian crossing the road, collision, etc.), and may also include video data captured by a camera on a vehicle or coupled to an RSU 204.

Such V2X data may enable autonomous driving and improve road safety and traffic efficiency. For example, the exchanged V2X data may be utilized by a V2X connected vehicle 202a/202b to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian 206 or cyclist may be utilized to trigger a warning sound, vibration, flashing light, etc., in case of imminent danger.

V2N communication may utilize traditional cellular links to provide cloud services to a V2X device (e.g., within a vehicle 202a/202b or RSU 204, or on a pedestrian 206) for latency-tolerant use cases. For example, V2N may enable a V2X network server to broadcast messages (e.g., weather, traffic, or other information) to V2X devices over a wide area network and may enable V2X devices to send unicast messages to the V2X network server. In addition, V2N communication may provide backhaul services for RSUs 204.

Various aspects of the present disclosure relate to algorithms for a wireless UE to join a group of one or more other wireless UEs. As one example to help illustrate the general concepts of this disclosure, such a group of UEs may correspond to a group of vehicles, wherein the group may be referred to as a platoon. However, it is to be understood that the broader aspects of this disclosure and the appended claims are not limited to such platoons, or any particular type of group of UEs.

Figure 3:
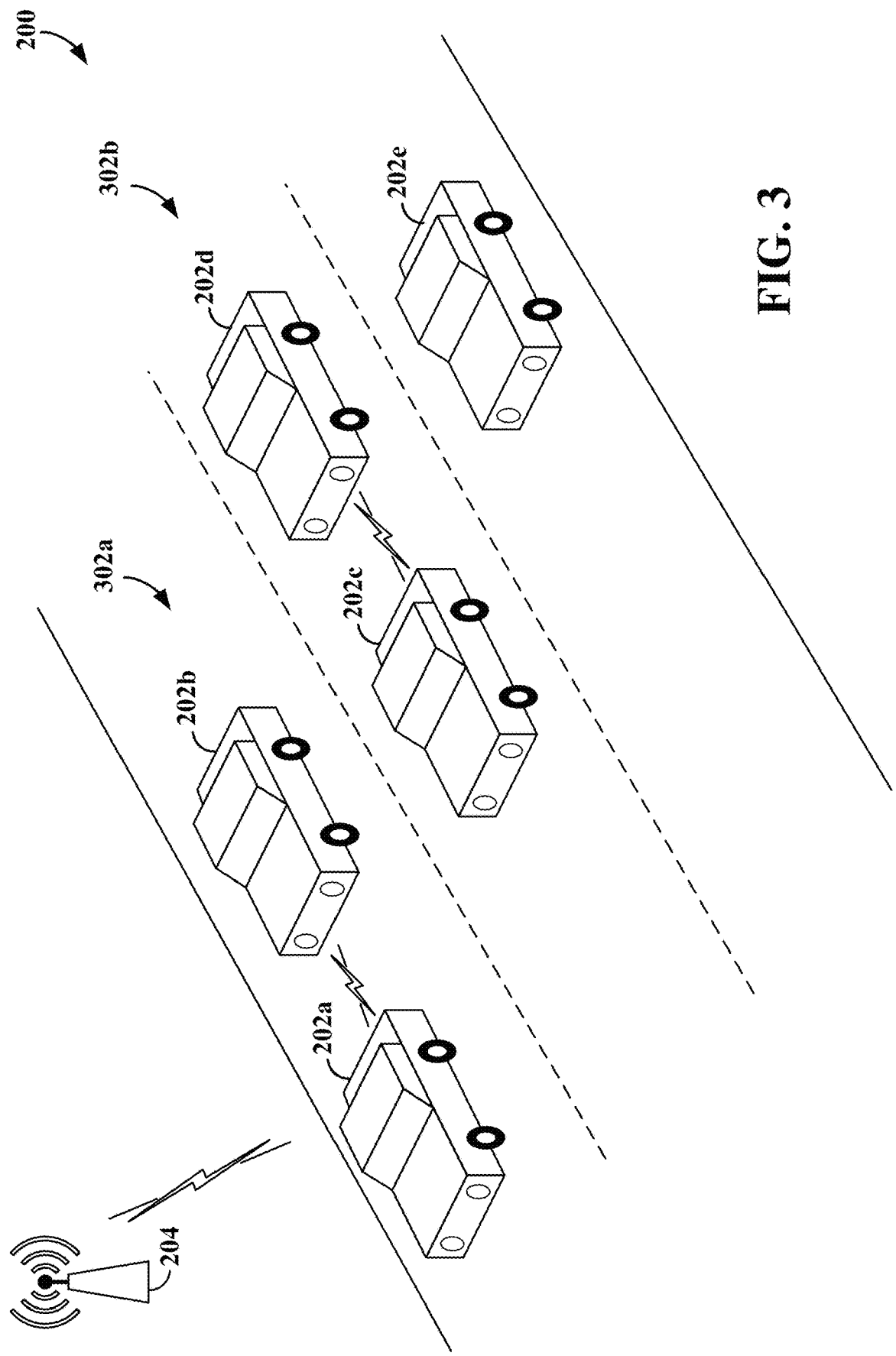
FIG. 3 is a diagram illustrating an example of vehicle platooning in a vehicle-based wireless communication network.

FIG. 3 is a diagram illustrating an example of platooning in a V2X wireless communication network 200. Platooning refers to the ability of autonomous or semi-autonomous vehicles to organize into platoons to engage in automated cooperative driving. In the illustrated example, each platoon includes two or more vehicles traveling in the same lane at substantially the same speed in a train-like manner to maintain a small, nearly constant inter-vehicle distance therebetween. In the example shown in FIG. 3, two platoons 302a and 302b are illustrated, each including two vehicles, for simplicity. For example, a first platoon 302a includes vehicles 202a and 202b, while a second platoon 302b includes vehicles 202c and 202d.

One of the vehicles in each of the platoons 302a and 302b may operate as a group leader (in this platooning example, a platoon leader (PL)) of the group or platoon and is responsible for setting the route, inter-vehicle distance, and speed of the platoon. The remaining vehicles may be referred to herein as group members or platoon members (PMs), which implement the route, inter-vehicle distance, and speed set by the PL. The PL is further responsible for joining and removing PMs to and from the platoon. For example, a vehicle, such as vehicle 202e, desiring to join a particular platoon (e.g., the second platoon 302b) may transmit a join request to the PL (e.g., vehicle 202c) of the second platoon 302b. The PL 202c may then transmit a join response to the vehicle 202e that confirms or denies the joinder of the vehicle 202e to the second platoon 302b.

All of the vehicles in a platoon 302a or 302b may communicate with each other to exchange platoon information related to, for example, their speed, direction, and/or data obtained from on-board sensors (e.g., cameras, LiDARS, radars, etc.). In addition, the PL may communicate additional platoon information, such as the platoon identifier (ID) or group ID, geographical location of the PL, inter-vehicle distance, planned route of the platoon, number and/or list of PMs in the platoon, recommended/known individual PM information (e.g., speed, relative position in the platoon, and transmit power of PMs in the platoon), and event messages indicating braking, accelerating, and/or steering to be performed by the vehicles in the platoon. For example, the event message may instruct the vehicles in the platoon to change lanes, may include a crash warning, or other event that may indicate that the vehicle should perform braking, accelerating, or steering.

In some examples, such platoon information may be exchanged using cooperative awareness messages (CAMs). Each PM in a platoon may utilize CAMs from the PL and from the immediately preceding vehicle, along with on-board sensor information, to adjust its speed (e.g., by braking or accelerating) and position (e.g., by performing steering).

The CAMs may be transmitted over wireless resources allocated to each platoon 302a and 302 by the RSU 204. In some examples, the RSU 204 may allocate dedicated V2X resources to platoons 302a and 302b dynamically according to requests from PMs/PLs or semi-persistently by reserving resources for periodic transmissions by each PM/PL in each platoon 302a and 302b. In some examples, the resources may be allocated to support half-duplex V2X communication.

Each platoon 302a and 302b may be either a public platoon or a private platoon. A private platoon may be, for example, a tour platoon, public safety platoon, or other platoon that is only open to vehicles that meet certain criteria or require a certain clearance to join. For private platoons, at least some of the platoon information transmitted by the PL may be private to protect the security of the platoon. Examples of private platoon information may include, for example, the inter-vehicle distance, planned route of the platoon, number and/or list of PMs in the platoon, and the recommended individual PM information (e.g., speed, relative position in the platoon, and wireless transmit power utilized by PMs in the platoon). Other platoon information transmitted by the PL or by other PMs may be public platoon information that may be known to the RSU 204 and other vehicles outside of the platoon.

In some examples, private platoon information may be scrambled with a private key known only to the PMs in the platoon. Thus, the private platoon information may not be able to be decoded by the RSU 204 or other vehicles in other platoons. As such, a vehicle (e.g., vehicle 202*e*) seeking to join a platoon may not have the requisite information needed to determine whether to request to join the private platoon. In addition, the half-duplex nature of V2X communication may cause the vehicle 202*e* to miss some of the public platoon information transmitted by one or more platoons, which may further prevent the vehicle 202*e* from identifying a platoon to join.

Therefore, in various aspects of the present disclosure, a robust signaling approach for communication between vehicle 202*e* joining a platoon, and an identified platoon (e.g., first platoon 302*a* and/or second platoon 302*b*), can provide for reliable joining of a platoon even in these or other circumstances. For example, when a vehicle wishes to join a platoon, it may broadcast a query message to any platoons that may be nearby. Any nearby platoon, if interested in allowing the vehicle to join, may respond by transmitting a joining invitation message. This invitation message may be transmitted to the querying vehicle via unicast signaling. The vehicle may then select one from among any number of nearby platoons that transmitted to it an invitation message, and may transmit a joining request message to the selected platoon via unicast signaling.

For reasons of clarity of explanation, and without limiting the waveform that may be utilized within the scope of the below-appended claims, various aspects of the present disclosure will be described with reference to an OFDM waveform, schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms, or any other suitable waveform.

Figure 4:
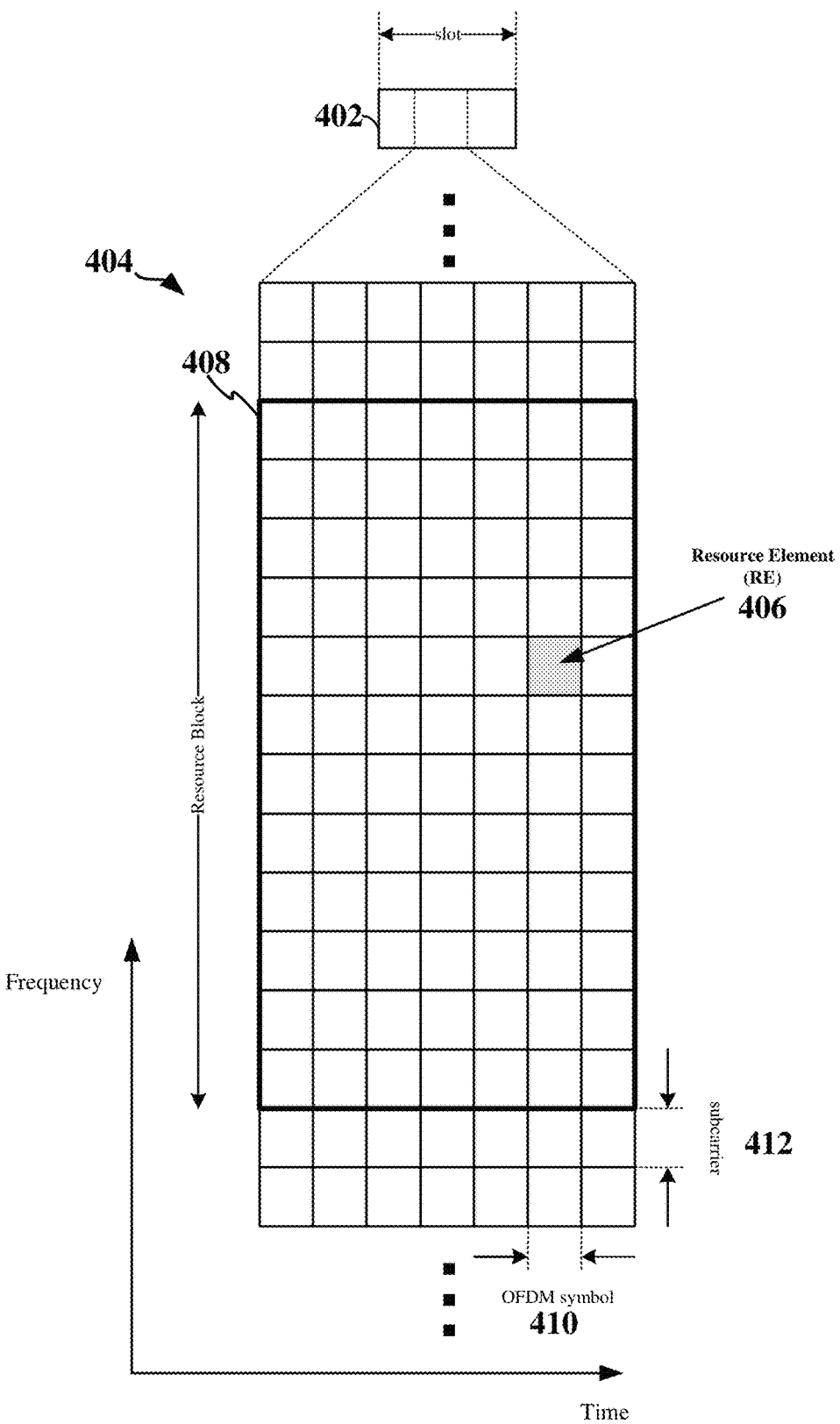
FIG. 4 is a schematic diagram illustrating organization of wireless resources in an air interface utilizing orthogonal frequency divisional multiplexing (OFDM).

Referring now to FIG. 4, an expanded view of an exemplary slot 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols 410; and frequency is in the vertical direction with units of subcarriers 412.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers 412 in the frequency domain. In one example, an RB may include twelve subcarriers, a number independent of the numerology used. In some examples, depending on the numerology, an RB may include any suitable number of consecutive OFDM symbols 410 in the time domain.

A UE or V2X device generally utilizes only a subset of the resource grid 404. An RB may be the smallest unit of resources that can be allocated to or reserved by a UE or V2X device. Thus, the more RBs scheduled for or reserved by a UE or V2X device, and the higher the modulation scheme chosen for the air interface, the higher the data rate for the UE or V2X device.9

In this illustration, the RB 408 is shown as occupying less than the entire bandwidth of the slot 402, with some subcarriers 412 illustrated above and below the RB 408. In a given implementation, the slot 402 may have a bandwidth corresponding to any number of one or more RBs 408. Further, in this illustration, the RB 408 is shown as occupying less than the entire duration of the slot 402, although this is merely one possible example.

Figure 5:
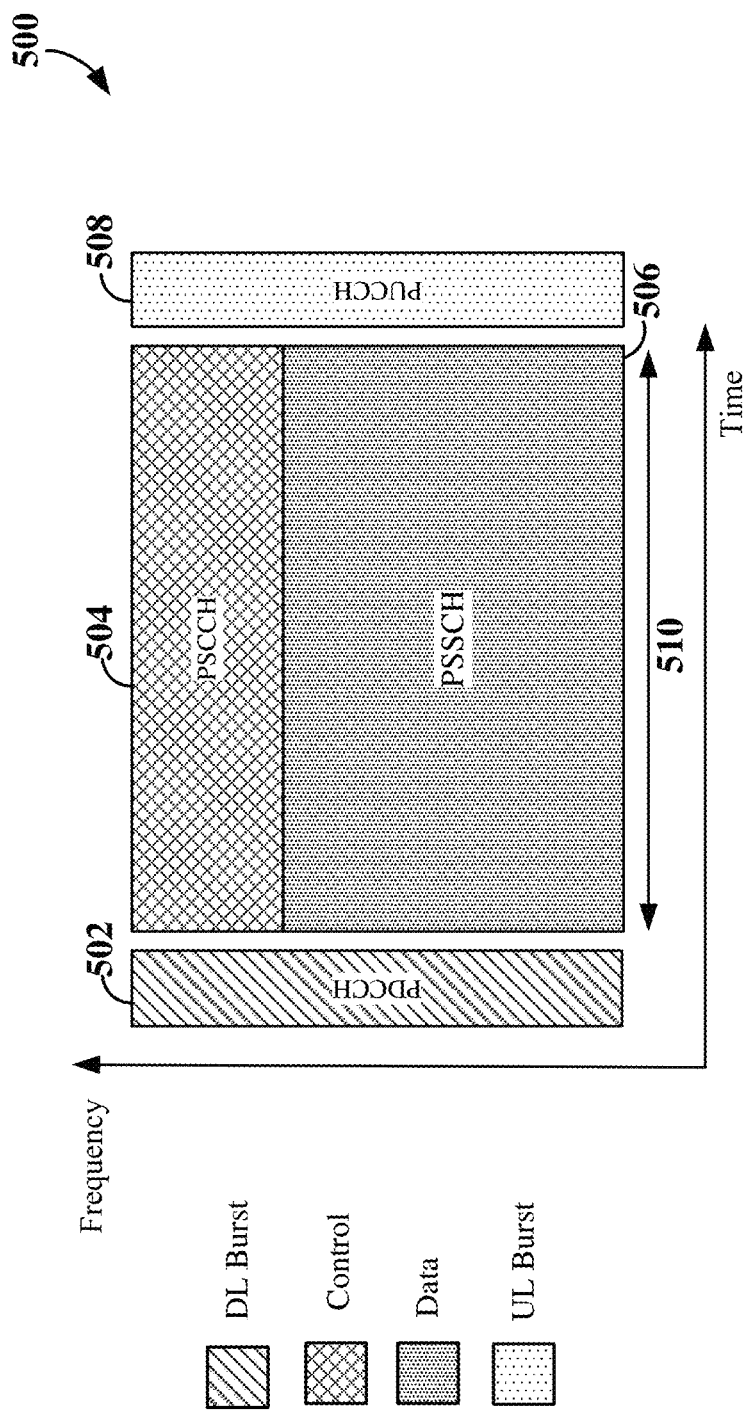
FIG. 5 illustrates an example of a slot that may be utilized to communicate over a wireless channel.

In various aspects of the disclosure, vehicle-based wireless communications may be transmitted over a V2X channel or the like, possibly including spectrum that is divided into a plurality of subframes or slots. FIG. 5 illustrates an example of a slot 500 that may be utilized to communicate over such a V2X channel. In the example shown in FIG. 5, time is illustrated along a horizontal axis, while frequency is illustrated along a vertical axis.

In some examples, the slot 500 may be utilized for broadcast or unicast communication. A broadcast communication may refer to a point-to-multipoint transmission by one V2X device (e.g., a vehicle, roadside unit (RSU), UE of a pedestrian/cyclist, or other V2X device) to other V2X devices. A unicast communication may refer to a point-to-point transmission by one V2X device (e.g., a vehicle, roadside unit (RSU), UE of a pedestrian/cyclist, or other V2X device) to a single other V2X device.

In this example, the slot 500 may include a downlink (DL) burst 502, which may include a physical downlink control channel (PDCCH), in the initial of beginning portion of the slot 500. The DL burst 502 may include control information related to the slot 500 that may be transmitted by an RSU (base station) towards one or more of a set of V2X devices nearby the RSU. In some examples, the control information may include synchronization information to synchronize communication by a plurality of V2X devices on the V2X channel. In addition, the control information may include scheduling information indicating one or more resource blocks allocated to V2X devices (e.g., platoon leaders (PLs) and/or platoon members (PMs) of one or more platoons) for device-to-device (D2D) or sidelink communication between the PL and PM's.

The slot 500 may further include a control portion 504 and a data portion 506 frequency-division multiplexed with the control portion 504 that collectively form a transmit section 510 of the slot 500. Based on the scheduling information, the V2X devices (PLs/PMs) may transmit control information within the control portion 504 and data within the data portion 506 of the transmit section 510. In some examples, the control information may be transmitted within a physical sidelink control channel (PSCCH), while the data may be transmitted within a physical sidelink shared channel (PSSCH).

In some examples, the control information transmitted by an individual vehicle (e.g., a PM) may include, for example, an indication that a new platoon is being formed, an indication that the PM is assuming the role of PL within a new or existing platoon, a join request to join a platoon, or information related to the data to be transmitted by the individual vehicle, such as an indication of the allocated wireless resources for the data, a modulation and coding scheme (MCS) utilized for the data, an indication of whether the data relates to an initial data transmission or a retransmission, etc. The data transmitted by an individual vehicle (e.g., a PM) may include, for example, vehicle information (e.g., the position, speed, trajectory, etc. of the vehicle), acknowledgement information (e.g., an ACK/NACK to the PL) and/or join request data, such as a platoon ID or group ID of the platoon that the vehicle is requesting to join.

In some examples, the control information transmitted by a PL within a platoon may include, for example, a platoon ID or information related to the data to be transmitted by the PL, such as an indication of the allocated wireless resources for the data, a modulation and coding scheme utilized for the data, an indication of whether the data relates to an initial data transmission or a retransmission, etc. The data transmitted by a PL may include, for example, both public platoon information and private platoon information. For example, the public platoon information may include the platoon ID, geographical location of the PL, speed and trajectory (direction) of the PL, an indication of whether the platoon is a private group (e.g., a one bit private platoon indicator), and event messages indicating braking, accelerating, or steering to be performed by the vehicles in the platoon. The private platoon information may include, for example, the inter-vehicle distance, planned route of the platoon, number and/or list of PMs in the platoon, recommended/known individual PM information (e.g., speed, relative position in the platoon, and transmit power of PMs in the group).

In some examples, the slot 500 may further include an uplink (UL) burst portion 508, which may include a physical uplink control channel (PUCCH), in the end of the slot 500. The PUCCH may include control information such as a request for resources transmitted from V2X devices (e.g., PLs/PMs) to the RSU. As illustrated in FIG. 5, the end of the DL burst 502 may be separated in time from the beginning of the control portion 504 and the end of the transmit section 510 may be separated in time from the beginning of the UL burst 508. This time separation may sometimes be referred to as a gap, a guard period, a guard interval, and/or various other suitable terms. This separation may provide time for the various V2X devices to perform a switch-over between transmitting and receiving, or vice-versa.

Figure 6:
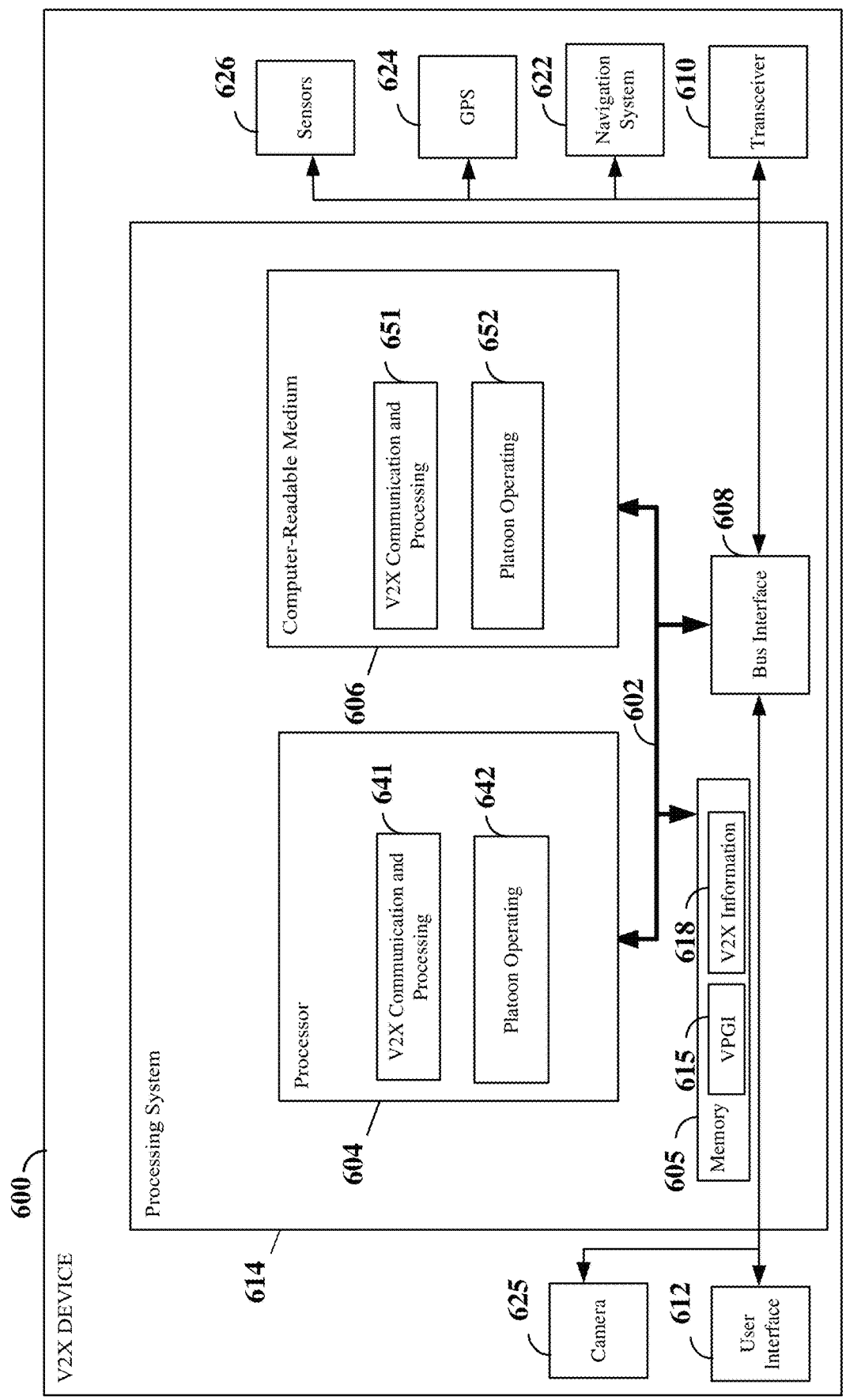
FIG. 6 is a block diagram illustrating an example of a hardware implementation for a vehicle or other device for use in a vehicle employing a processing system according to some aspects of the present disclosure.

FIG. 6 is a block diagram illustrating an example of a hardware implementation for a V2X device 600 within a vehicle employing a processing system 614. For example, the V2X device 600 may be included within one of the vehicles shown and described above in reference to FIGS. 1, 2, and/or 3.

The V2X device 600 may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the V2X device 600 may be configured to perform any one or more of the functions described herein. That is, the processor 604, as utilized in the V2X device 600, may be used to implement any one or more of the processes and procedures described below.

In this example, the processing system 614 may be implemented with a bus architecture, represented generally by the bus 602. The bus 602 may include any number of interconnecting buses and bridges depending on the specific application of the processing system 614 and the overall design constraints. The bus 602 links together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further.

A bus interface 608 provides an interface between the bus 602 and a transceiver 610. The transceiver 610 provides a means for communicating with various other apparatus over a transmission medium (e.g., air interface). Depending upon the nature of the apparatus, a user interface 612 (e.g., keypad, display, touch screen, speaker, microphone, control knobs, etc.) may also be provided. Of course, such a user interface 612 is optional, and may be omitted in some examples. The bus interface 608 further provides an interface between the bus 602 and one or more peripherals. For example, peripherals may include a navigation system 622, a global positioning system (GPS) receiver 624, one or more sensors 626, and/or a camera 625. The navigation system 622 provides a means for mapping or planning a route to one or more destinations for the V2X device 600. In the illustrated example, the navigation system 622 is illustrated external to the processing system 614; however, in another example, the navigation system 622 may be internal to the processing system 614, e.g., operational by the processor 604 utilizing software stored on the computer-readable medium 606. The GPS receiver 624 provides a means for communicating with a plurality of GPS satellites and determining position, speed, and trajectory (direction) information of the V2X device 600. The one or more sensors 626 may include any suitable set of one or more sensors, including, for example, sensors for determining whether the V2X device 600 is braking or accelerating. The set of sensors 626 may further include other types of gauges, such as a speedometer. The camera 625 may include a back-up camera or other camera within the vehicle.

The processor 604 is responsible for managing the bus 602 and general processing, including the execution of software stored on the computer-readable medium 606. The software, when executed by the processor 604, causes the processing system 614 to perform the various functions described below for any particular apparatus. The computer-readable medium 606 and the memory 605 may also be used for storing data that is manipulated by the processor 604 when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. In some examples, the computer-readable medium 606 may be part of the memory 605. Those skilled in the art will recognize how best to implement the described functionality presented throughout this disclosure depending on the particular application and the overall design constraints imposed on the overall system.

In some aspects of the disclosure, the processor 604 may include circuitry configured for various functions. For example, the processor 604 may include V2X communication and processing circuitry 641 configured to communicate over a V2X channel to exchange V2X information 618 with V2X devices and/or with a network. In some examples, the communication and processing circuitry 641 may be configured to communicate with one or more other V2X entities including but not limited to other vehicles, roadside units (RSUs), etc. The communication and processing circuitry 641 may, for example, process announcement or warning messages from nearby platoons about their presence. The communication and processing circuitry 641 may operate in coordination with communication and processing software 651.

The processor 604 may further include platoon operating circuitry 642 configured to enable the V2X device 600 to create a platoon, lead a platoon, join a platoon, operate within the platoon, and/or leave a platoon. In some examples, the platoon operating circuitry 642 may be configured to obtain V2X information 618 from the navigation system 622, GPS receiver 624, sensors 626, and/or camera 625. In addition, the platoon operating circuitry 642 may be configured to receive V2X information 618 from one or more neighbor V2X devices (e.g., vehicles, mobile devices of pedestrians, RSUs, etc.) or from a V2X server via the transceiver 610. The platoon operating circuitry 642 may further be configured to utilize the V2X information 618 to derive VPGI 615 for the vehicle and to operate together with the V2X communication and processing circuitry 641 to transmit the VPGI 615 to other V2X devices within the platoon.

In examples in which the V2X device 600 is a platoon member (PM) of a platoon, the platoon operating circuitry 642 may be configured to receive VPGI 615 from the platoon leader (PL) and at least the immediately preceding V2X device in the platoon and to transmit the VPGI 615 of the V2X device 600 (e.g., the speed and direction of the vehicle, along with data obtained from various peripherals (e.g., navigation system 622, GPS receiver 624, camera 625, and sensors 626)) to the immediately following V2X device. In addition, the V2X device 600 may be configured to utilize the VPGI of the PL and the immediately preceding vehicle, together with data from the peripherals to adjust the speed of the vehicle associated with the V2X device (e.g., by providing instructions to the vehicle to perform braking or accelerating) and/or position of the vehicle associated with the V2X device (e.g., by providing instructions to the vehicle to perform steering).

In examples in which the V2X device 600 is a PL of a platoon, the platoon operating circuitry 642 may further be configured to operate together with the V2X communication and processing circuitry 641 to generate and transmit VPGI 615, together with other V2X information 618 (e.g., traffic information, weather information, road hazard information, map data, the location of one or more pedestrians or cyclists, etc.) to PMs within the platoon.

The platoon operating circuitry 642 may further be configured to receive a query from a vehicle requesting the VPGI 615 of the platoon to which the V2X device belongs. The query may include an indication of the wireless resources (resource blocks) that the V2X device should utilize to transmit the VPGI 615 to the requesting vehicle.

In examples in which the V2X device is the PL of a platoon, in response to receiving the query, the platoon operating circuitry 642 may operate together with the V2X communication and processing and circuitry 641 to generate and transmit a query response to a requesting vehicle that includes at least a portion of the VPGI 615 of the platoon. The VPGI 615 transmitted within the query response may include, for example, information to enable other vehicles in joining the platoon. In some examples, the platoon operating circuitry 642 may decide to not respond to the query, for example, when the platoon is full.

In examples in which the V2X device 600 is seeking to join a platoon, the platoon operating circuitry 642 may further be configured to operate together with the V2X communication and processing circuitry 641 to generate and transmit a query message to any nearby platoons. The query may include, for example, an identifier of the vehicle (e.g., V2X device within the vehicle), the speed of the vehicle, the trajectory (direction of travel) of the vehicle, the current geographical location of the vehicle, an intended or desired route of the vehicle and/or other vehicle information.

The platoon operating circuitry 642 may further be configured to receive a query response from a proximate PL, containing at least a portion of the VPGI 615 of one or more surrounding platoons. For example, the VPGI 615 for each platoon included in the query response may include the route, speed, direction of travel, and group identifier of each of the platoons. In addition, the query response may indicate wireless resources for the V2X communication and processing circuitry 641 to transmit a join request to each of the platoons. The wireless resources may be dedicated to join requests to reduce blind decoding by the PL.

Based on the received VPGI 615, the platoon operating circuitry 642 may select one of the platoons and transmit a join request to the PL of the selected platoon utilizing the indicated wireless resources for the join request. The join request may include, for example, the vehicle identifier of the vehicle associated with the V2X device 600 and the vehicle information of the V2X device 600.

In response to the join request, the platoon operating circuitry 642 may receive a join response carrying an acceptance (confirmation) message or a denial message. In some examples, when the join response includes a denial message, the platoon operating circuitry 642 may select another platoon to join and may transmit another join request to the other platoon. In other examples, the platoon operating circuitry 642 may decide to delay joining any of the other nearby platoons when the join response includes a denial message.

In examples in which the V2X device 600 is a PL of a platoon, the platoon operating circuitry 642 may receive the join request from a vehicle requesting to join the platoon. The join request may be generated, for example, based on VPGI provided to the vehicle from the RSU and/or the V2X device 600 of the PL. The platoon operating circuitry 642 may then determine whether to allow the vehicle to join the platoon based on one or more factors, including, for example, the number of vehicles currently in the platoon, the maximum number of vehicles allowed in the platoon, the vehicle identifier of the vehicle, and other vehicle information of the vehicle. The platoon operating circuitry 642 may then operate together with the V2X communication and processing circuitry 641 to generate and transmit the join response including the confirmation message or the denial message to the vehicle requesting to join. The platoon operating circuitry 642 may further be configured to operate in coordination with platoon operating software 652.

Figure 7:
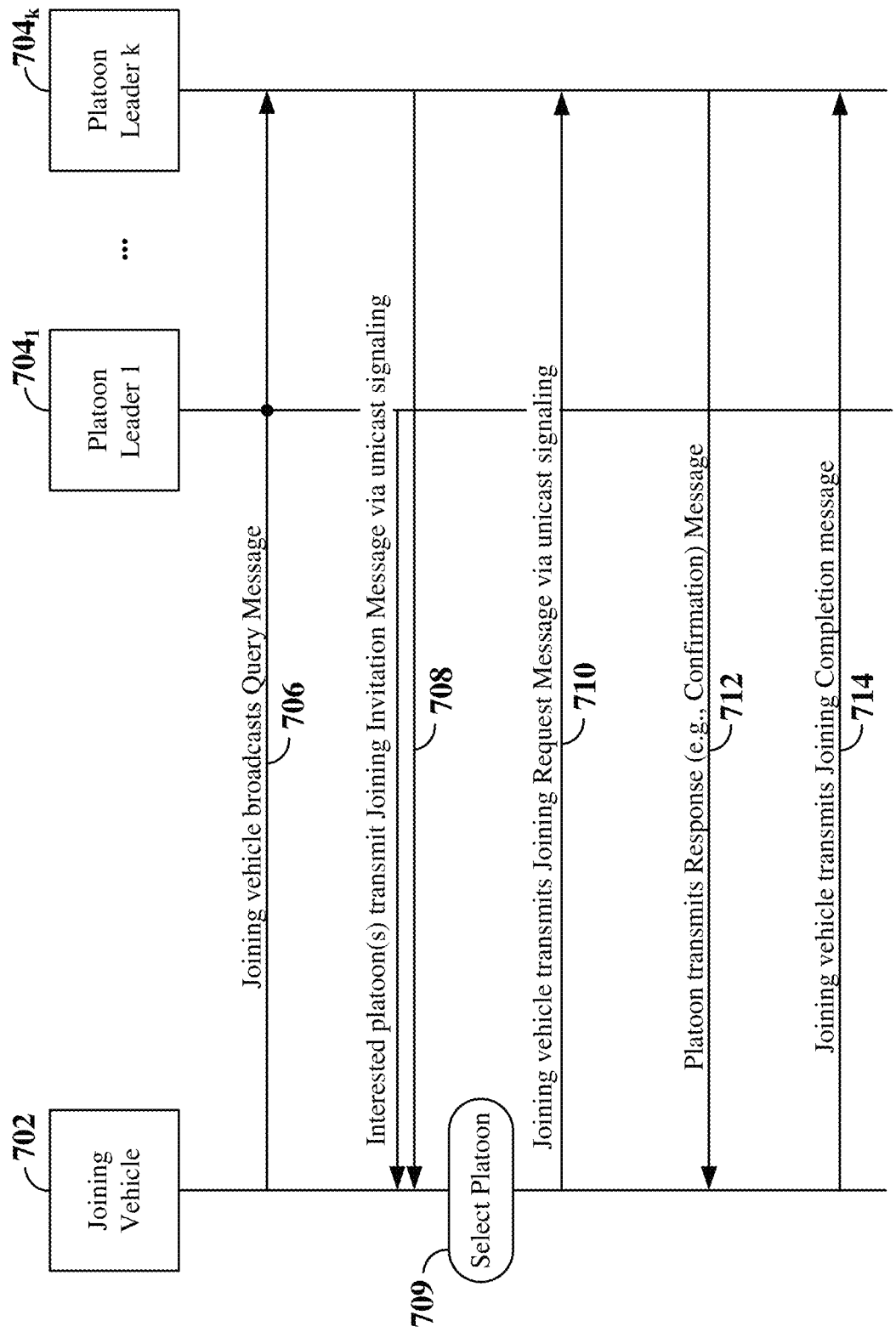
FIG. 7 is a message flow diagram illustrating exemplary signaling between a vehicle and one or more platoon leaders (PL) of platoons according to some aspects of the present disclosure.

FIG. 7 is a message flow diagram illustrating exemplary signaling between a vehicle 702 seeking to join a platoon, and a plurality of platoon leaders (PLs) $\{704_1 \ldots 704_k\}$ that may be within communication range of the joining vehicle 702. In some examples, the joining vehicle 702 and the PLs $\{704_1 \ldots 704_k\}$ may correspond to the V2X device 600 described above and illustrated in FIG. 6.

At 706, the joining vehicle 702 may transmit a query message generally indicating that the joining vehicle 702 wishes to join a vehicle group or platoon. In one aspect, the query message 706 may include information such as an identifier (ID) and vehicle course information. Here, the vehicle course information may include, for example, a position, speed, direction, or destination of the joining vehicle 702, and/or a combination thereof.

In some examples, the query message 706 may be configured to be transmitted as a broadcast message, intended to be received by any and/or all PLs that may be within communication range of the joining vehicle 702. Here, because of potential issues (described above) where the joining vehicle 702 may fail to properly receive an announcement or warning message from one or more proximate platoons, or any other reason, the joining vehicle 702 may be unaware of the existence of one or more proximate platoons. However, according to an aspect of the present disclosure, the joining vehicle 702 need not necessarily be aware of those platoons and may simply broadcast the query message with the expectation that any proximate platoon, if it exists, may receive the broadcast.

In some examples, to improve the reliability of transmission of the query message 706 and the probability that any proximate platoon would receive the query message, the joining vehicle 702 may transmit the query message 706 utilizing two or more different wireless resources. For example, the joining vehicle 702 may transmit the query message 706 two or more times, separated by time, to improve the message reliability by virtue of time diversity. In particular, transmitting utilizing two or more separate time resources can reduce the probability that a proximate platoon may fail to receive the query message 706 due to the half-duplex issue described above. In another example, the joining vehicle 702 may transmit the query message 706 utilizing two or more different frequencies, to improve the message reliability by virtue of frequency diversity. In yet another example, the joining vehicle 702 may transmit the query message 706 utilizing two or more different antennas, beamforming directions, and/or MIMO configurations, to improve the message reliability by virtue of spatial diversity. Of course, those of ordinary skill in the art will comprehend that any combination of the above may be utilized for the transmission of a query message, and further, that any other transmission diversity scheme may be utilized as well.

In a further example, the joining vehicle 702 may select the set of wireless resources to utilize for transmission of the query message 706 based on a suitable set of parameters. Here, the set of parameters may be a random or pseudo-random selection. That is, the selection of the wireless resources for transmitting the query message 706 may include randomly selecting the wireless resources from among a set of resources.

In a still further example, the joining vehicle 702 may scramble the query message 706 utilizing a suitable signature sequence or scrambling sequence. Here, the joining vehicle 702 may select a device-specific (e.g., vehicle-specific) scrambling sequence, which may enable identification of the joining vehicle 702 and/or may be configured to be orthogonal to, or substantially orthogonal to scrambling sequences that may be selected by other vehicles for such query messages. In another example, the joining vehicle 702 may randomly select a scrambling sequence from among a given resource pool, for scrambling the query message 706. In some examples, the resource pool may be a dedicated resource pool for the transmission of such query messages.

Figure 8:
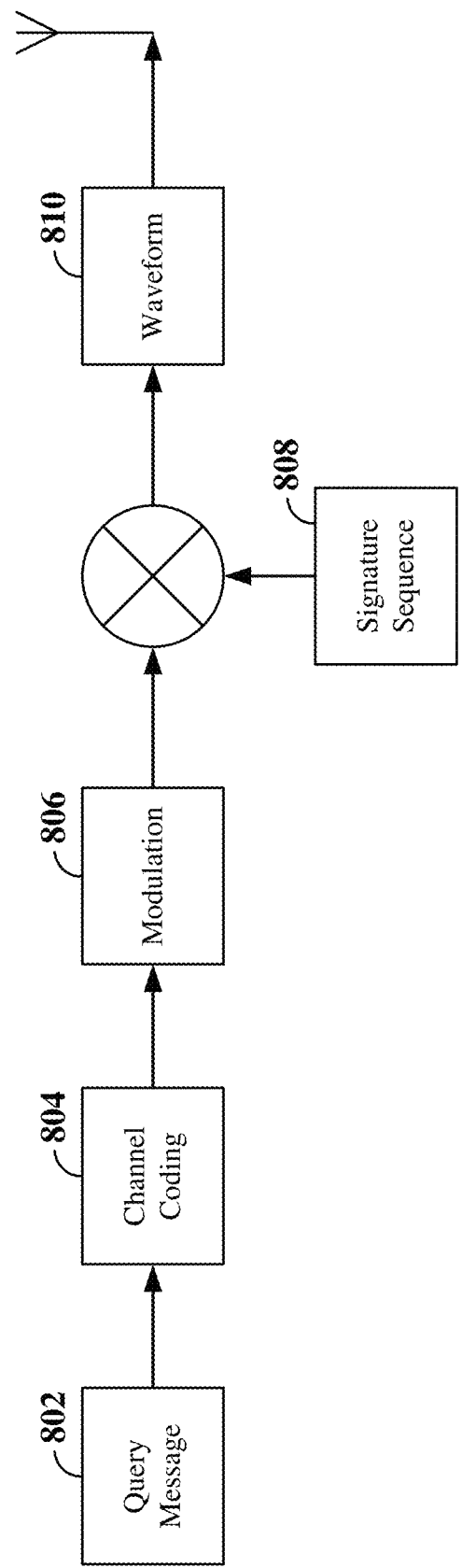
FIG. 8 is a schematic illustration of a portion of an exemplary radio apparatus for generating and transmitting a query message from a vehicle according to some aspects of the present disclosure.

FIG. 8 is a block diagram illustrating a portion of an exemplary radio apparatus for generating and transmitting a query message 706 from a vehicle such as the joining vehicle 702 according to some aspects of the present disclosure. In this illustration, the different blocks may schematically represent signals, information, functional blocks, and/or suitable circuitry or components. For example, block 802 represents the information corresponding to the query message 706 discussed above, which may be transmitted by the joining vehicle 702. According to an aspect of the present disclosure, at block 804 the joining vehicle 702 may apply a suitable channel coding algorithm to the query message 706, and at block 806, the joining vehicle 702 may apply a suitable modulation to the encoded message.

At block 808, the joining vehicle 702 may apply a signature sequence or scrambling sequence to the modulated and encoded query message, as described above. Again, the selected signature sequence may be randomly selected in some examples from a given resource pool, which may be dedicated for the transmission of such query messages. At block 810, the joining vehicle 702 may apply a suitable waveform to carry the query message 706, which may then be transmitted (e.g., broadcasted) over the air interface.

Returning now to FIG. 7, at 708, one or more group heads or platoon leaders (e.g., k PLs $\{704_1 \ldots 704_k\}$) proximate to the joining vehicle 702 may respond to the query message by transmitting a joining invitation message generally indicating that the joining vehicle 702 is invited to join a vehicle group or platoon. Here, the invitation message 708 may include, for example, a group ID that identifies the corresponding platoon, and platoon course information. Here, the platoon course information may include, for example, a position of the platoon, a speed of the platoon, a direction of the platoon, a platoon route, a number of platoon members, and/or a combination thereof.

In some examples, the invitation message 708 may be configured to be transmitted as a unicast message, intended for the joining vehicle 702 that transmitted the query message. For example, the invitation message 708 may be addressed to the joining vehicle 702 based on a vehicle ID included in the query message 706.

In a further example, the invitation 708 message may further include wireless resource information. Such resource information may include but is not limited to information characterizing wireless resources utilizes for communication within the platoon. Such wireless resource information may also include a set of wireless resources based at least in part on the query message 706 received from the joining vehicle 702. For example, a platoon leader may implicitly derive a set of resources to be identified in the invitation message 708 based on information in the query message 706. As one more specific example, the resource may be mapped one-to-one with the query message 706. That is, the wireless resource may be the same resource as the resource utilized for transmission of the query message 706, or may be based on that resource (e.g., by being determined based on an offset (e.g., a fixed or predetermined offset) relative to the resource utilized for transmission of the query message 706). In another example, the query message 706 may explicitly identify a wireless resource, and the joining invitation message 708 may include, for example, a confirmation of the requested resource.

At 709 the joining vehicle 702 may select a platoon from among the platoons whose PLs {PL$_1$ ... PL$_k$} transmitted a joining invitation message 708 to the joining vehicle 702. Accordingly, at 710 the joining vehicle 702 may transmit a joining request message to the selected platoon, generally indicating that the joining vehicle 702 wishes to join the selected platoon. Here, the joining request message 710 may include, for example, the group ID that identifies the selected platoon. Further, the joining request message 710 may be configured as a unicast message directed or addressed to the selected PL.

At 712 the PL of the selected platoon may transmit a response message to the joining vehicle 702. In some examples, the response message 712 may be a confirmation message, generally confirming that the joining vehicle 702 may join the platoon. Here, the confirmation message 712 may include an affirmative response to the joining request message 710. In such a case, the confirmation message 712 may include information for the joining vehicle 702 to join the platoon, such as group position information for the joining vehicle 702. Alternatively, the response message 712 may be a denial message, generally denying the joining vehicle 702 admittance into the platoon.

At 714 the joining vehicle 702 may optionally transmit a joining completion message generally indicating that the joining vehicle 702 has completed joining the platoon.

Figure 9:
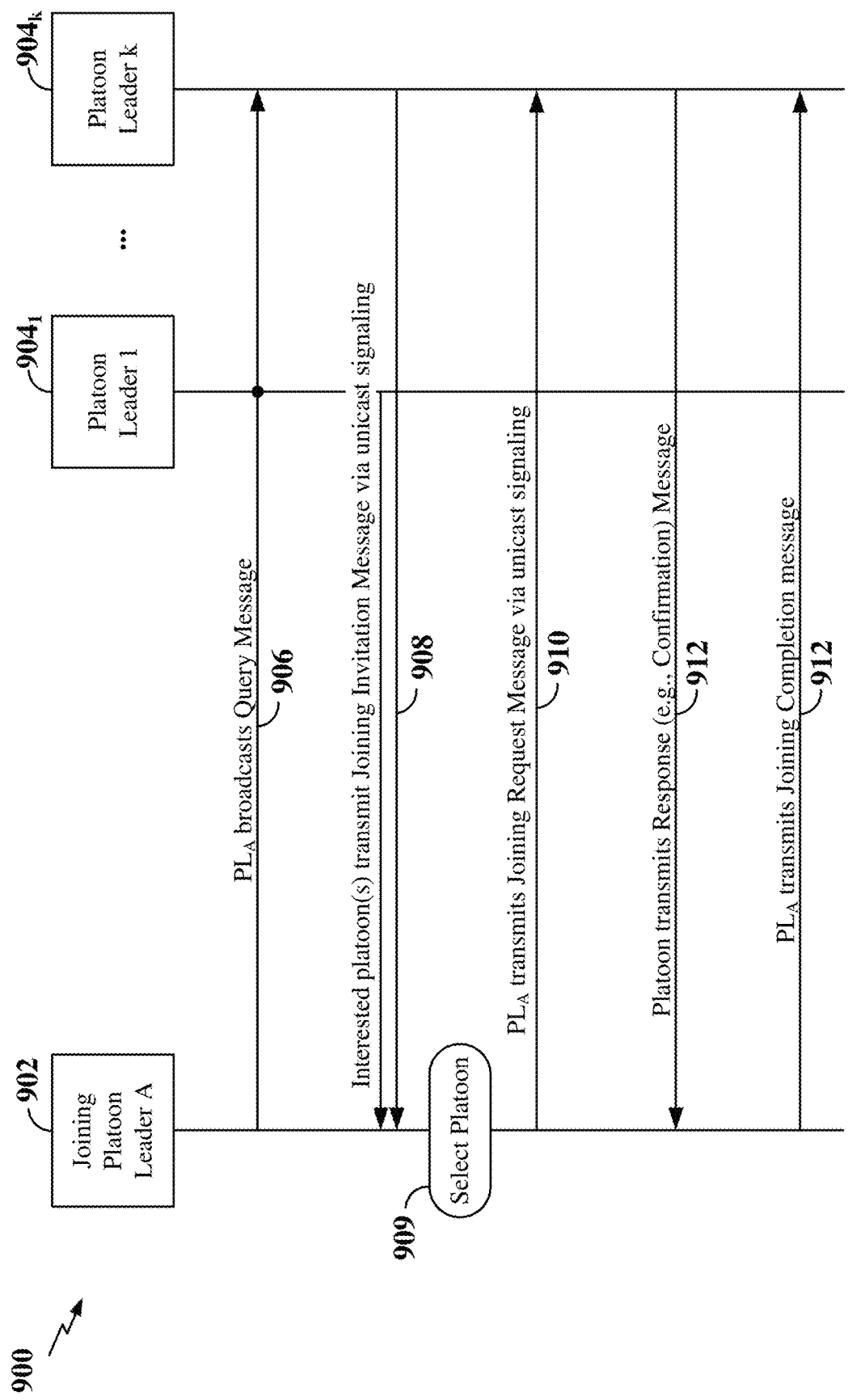
FIG. 9 is a message flow diagram illustrating exemplary signaling between a PL and one or more other PLs of platoons according to some aspects of the present disclosure.

Referring now to FIG. 9, according to a further aspect of the present disclosure, a vehicle that is already a member of (e.g., a PL of) an existing platoon may utilize substantially similar signaling to join its existing platoon with another, proximate platoon (e.g., platoon 1-$k$). In various examples, signaling utilized for a group or platoon to join another group or platoon is substantially the same as the signaling described above with respect to a single joining vehicle 702 joining a platoon.

At 906, the joining platoon leader PL$_A$ 902 may broadcast a query message as described above. However, here, in addition to or in alternative to a vehicle ID, the query message 906 may include a group ID or platoon ID corresponding to the query. In some examples, the query message 906 may further include an indication whether the joining platoon leader (e.g., PL$_A$ 902) is part of a vehicle group or platoon, seeking to join with another platoon. In some further examples, the query message 906 may also include an indication of a number of vehicles in the group sending the query message.

At 908, one or more group heads or platoon leaders (e.g., k PLs {904$_1$ ... 904$_k$}) proximate to the joining platoon leader 902 may respond to the query message by transmitting a joining invitation message generally indicating that the joining platoon leader 902 is invited to join another vehicle group or platoon. Here, the joining invitation message 908 may include, for example, a group ID that identifies the corresponding platoon, and platoon course information. As in the above example, the joining invitation message 908 may be configured as a unicast message addressed to the joining platoon leader 902, and may include wireless resource information. The joining request message 910 may include not only a group or platoon ID, but in some examples may further include a number of vehicles in the joining platoon, vehicle IDs for the vehicles that form the joining platoon, and/or other suitable information relating to the joining platoon.

At 912 the PL of the selected platoon may transmit a response message to the joining platoon leader 902. In some examples, the response message 912 may be a confirmation message, generally confirming that the joining platoon leader 902 and its platoon may join the selected platoon. Alternatively, the response message 912 may be a denial message, generally denying the joining platoon leader 902 admittance into the selected platoon.

At 914 the joining platoon leader 902 may optionally transmit a joining completion message generally indicating that the joining platoon leader 902 has completed joining the selected platoon.

Figure 10:
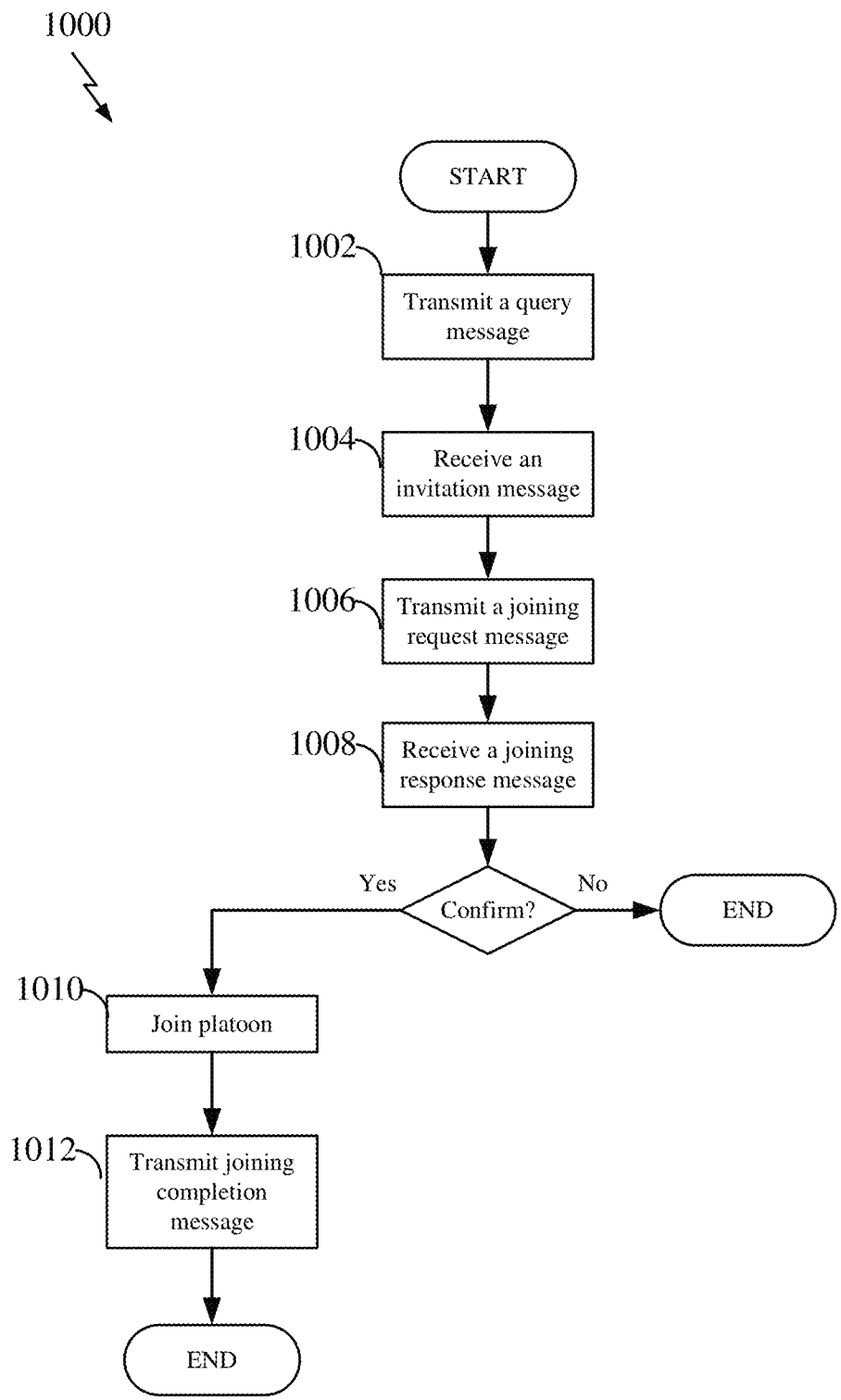
FIG. 10 is a flow chart illustrating an exemplary process for a wireless communication device joining a group according to some aspects of the disclosure.

FIG. 10 is a flow chart illustrating an exemplary process 1000 for a wireless communication device to join a group or platoon in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by the V2X device 600 illustrated in FIG. 6. In some examples, the process 1000 may be carried out by any suitable apparatus or means for carrying out the functions or algorithm described below.

At block 1002, the V2X device 600 may transmit a query message. In some examples, the query message may be a broadcast message. The query message may include information such as an identifier of the V2X device 600, course information of the V2X device 600, etc. Here, course information may include the V2X device's position, speed, or direction, its destination, or some combination thereof. The query message may further include, in some examples, information that explicitly identifies a wireless resource to be utilized for joining the vehicle group. The V2X device 600 may transmit the query message any suitable number of times, utilizing any suitable number of wireless resources. The wireless resource or resources utilized for transmitting the query message may be selected in any suitable manner. For example, a dedicated resource pool configured for transmission of such query messages may be utilized. In other examples, the wireless resources may be randomly selected. Further, the V2X device may scramble the query message using a scrambling sequence, selected from a resource pool of scrambling sequences.

In some examples, the V2X device 600 transmitting the query message may already be a part of a group or platoon, wishing to join its group with another group or platoon. In this example, the query message transmitted at block 1002 may include an indication that the V2X device 600 is part of a group seeking to join with the other group. Further, the query message may include a group identifier that identifies the group of which the V2X device 600 is already a member; a number of vehicles in that group; and/or any other suitable information relating to the group.

At block 1004, the V2X device 600 may receive an invitation message. In some examples, the invitation message may be a unicast message, directed to the V2X device 600. The invitation message may include information such as a group identifier, group course information, wireless resource information for joining a vehicle group, etc. Here, group course information may include the group's position, speed, or direction, a number of group members, the group's route, or some combination thereof. Further, the wireless resource information for joining the vehicle group may be based, at least in part, on the query message transmitted at block 1002. For example, the wireless resource information for joining the vehicle group may be implicitly derived from the query message. In another example, the wireless resource information for joining the vehicle group corresponds to the same resource used for transmitting the query message. In still another example, the wireless resource information for joining the vehicle group is determined based on a fixed shifting of time and/or frequency relative to the resource utilized for transmitting the query message.

At block 1006, the V2X device 600 may transmit a joining request message. The joining request message may include the group identifier of a group that the V2X device 600 may wish to join.

At block 1008, the V2X device 600 may receive a joining response message. The joining response message may include an affirmative or negative response to the joining request message transmitted at block 1006. When the joining response message includes an affirmative response, the joining response message may further include group position information for the V2X device 600.

At block 1010, the V2X device 600 may join the group or platoon. And at block 1012, the V2X device may transmit a joining completion message.

Figure 11:
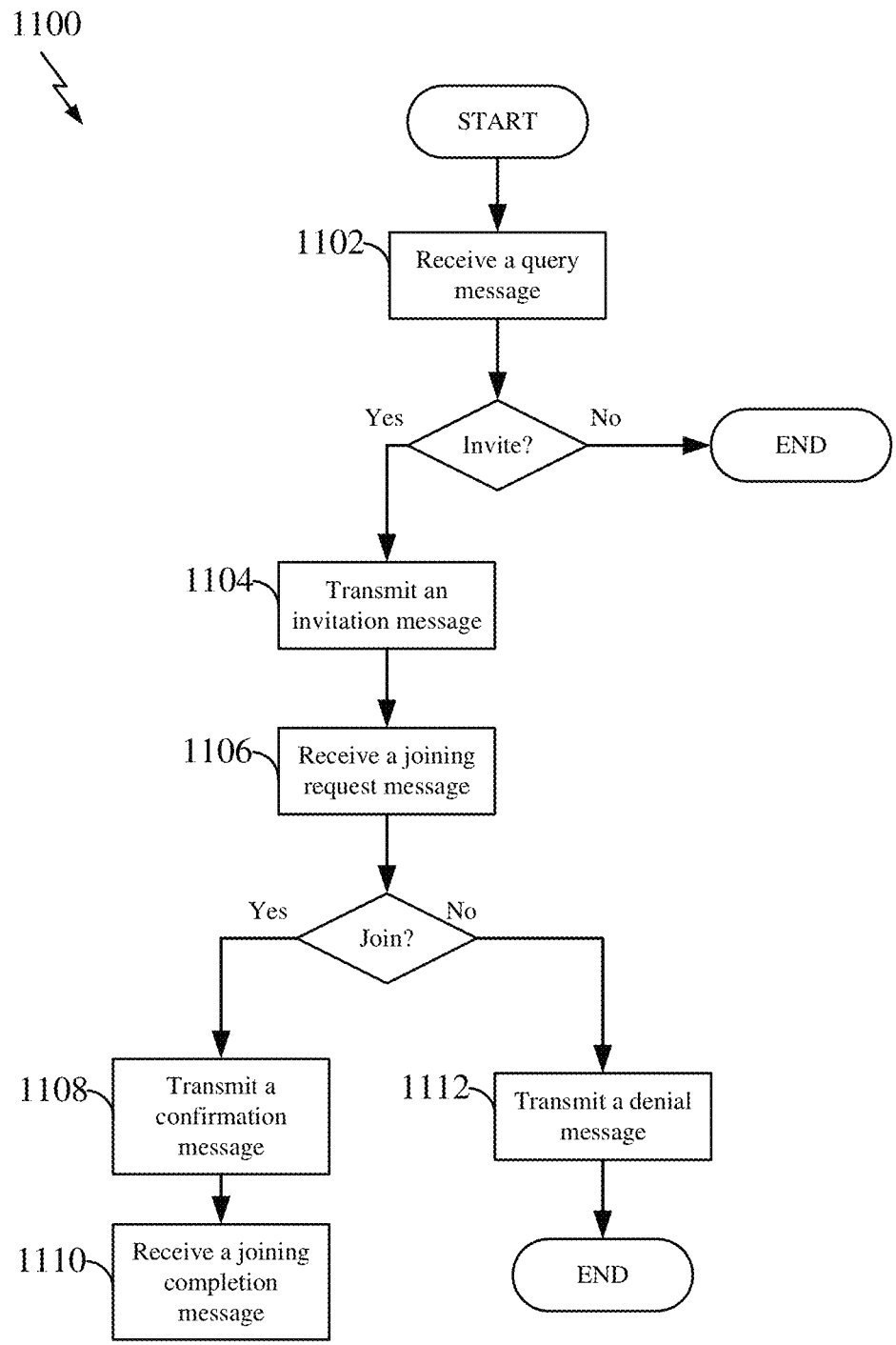
FIG. 11 is a flow chart illustrating an exemplary process for a group leader to join a wireless communication device into the group according to some aspects of the disclosure.

FIG. 11 is a flow chart illustrating an exemplary process 1100 for a wireless communication device acting as a group leader within a group or platoon, to control whether a joining vehicle can join the group or platoon in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the V2X device 600 illustrated in FIG. 6. In some examples, the process 1100 may be carried out by any suitable apparatus or means for carrying out the functions or algorithm described below.

At block 1102, the V2X device 600 may receive a query message from a joining device. In some examples, the query message may be a broadcast message. The query message may include information such as an identifier of the joining device, course information of the joining device, etc. Here, course information may include the joining device's position, speed, or direction, its destination, or some combination thereof. The query message may further include, in some examples, information that explicitly identifies a wireless resource to be utilized for joining the vehicle group. The query message may be received any suitable number of times, over any suitable number of wireless resources.

If the V2X device determines to invite the joining device to join the group or platoon, then at block 1104, the V2X device 600 may transmit an invitation message. In some examples, the invitation message may be a unicast message, directed to the joining device. The invitation message may include information such as a group identifier, group course information, wireless resource information for joining the vehicle group, etc. Here, group course information may include the group's position, speed, or direction, a number of group members, the group's route, or some combination thereof. Further, the wireless resource information for joining the vehicle group may be based, at least in part, on the query message received at block 1102. For example, the wireless resource information for joining the vehicle group may be implicitly derived from the query message. In another example, the wireless resource information for joining the vehicle group corresponds to the same resource used for receiving the query message. In still another example, the wireless resource information for joining the vehicle group is determined based on a fixed shifting of time and/or frequency relative to the resource utilized for receiving the query message.

At block 1106, the V2X device 600 may receive a joining request message. The joining request message may include a group identifier of the group of which the V2X device 600 is a member.

If the V2X device 600 determines to allow the joining device to join the group or platoon, then at block 1108, the V2X device 600 may transmit a confirmation message. The confirmation message may include an affirmative response to the joining request message transmitted at block 1106. The confirmation message may further include group position information for the joining device. And at block 1110, the V2X device 600 may receive a joining completion message.

On the other hand, if the V2X device 600 determines not to allow the joining device to join the group or platoon, then at block 1112, the V2X device 600 may transmit a denial message. The denial message may include a negative response to the joining request message transmitted at block 1106.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The invention claimed is:

1. A method for a wireless communication device to join a group, the method comprising, at the wireless communication device:
   transmitting, utilizing a wireless resource, a query message comprising an identifier and course information;
   receiving an invitation message comprising a first group identifier, first group course information, and wireless resource information for joining a first group, wherein the wireless resource information is based at least in part on the query message and wherein the wireless resource information is determined based on a fixed shifting of time and/or frequency relative to the wireless resource utilized for transmitting the query message; and
   transmitting a joining request message comprising the first group identifier.

2. The method of claim 1, further comprising, at the wireless communication device:
   receiving a joining response message comprising an affirmative or negative response to the joining request message.

3. The method of claim 2, wherein the joining response message comprises the affirmative response, and wherein the joining response message further comprises first group position information for the wireless communication device.

4. The method of claim 1, wherein the query message comprises a broadcast message, and wherein the invitation message comprises a unicast message directed to the wireless communication device.

5. The method of claim 4, wherein the joining request message comprises a unicast message directed to a group leader of the first group.

6. The method of claim 1, wherein the transmitting the query message comprises transmitting the query message two or more times utilizing two or more different wireless resources.

7. The method of claim 6, further comprising, at the wireless communication device, randomly selecting the two or more different wireless resources for transmitting the query message.

8. The method of claim 1, wherein the transmitting the query message comprises scrambling the query message utilizing a scrambling sequence, the method further comprising, at the wireless communication device:
   selecting a device-specific scrambling sequence, or randomly selecting a randomly selected scrambling sequence from a resource pool.

9. The method of claim 1, wherein the query message further comprises an indication whether the wireless communication device is part of a group seeking to join with another group.

10. The method of claim 1, wherein the wireless communication device is a member of a second group, and wherein the identifier comprises a second group identifier.

11. The method of claim 1, wherein the group comprises a vehicle platoon.

12. A method operable at a group leader within a group, the method comprising, at the leader:
   receiving, utilizing a wireless resource, a query message from a wireless communication device, comprising an identifier and course information;
   determining to invite the wireless communication device to join the group;
   transmitting an invitation message comprising a group identifier, group course information, and wireless resource information for joining the group, wherein the wireless resource information is based at least in part on the query message and determined based on a fixed shifting of time and/or frequency relative to the wireless resource utilized for the query message; and
   receiving a joining request message from the wireless communication device, comprising the group identifier.

13. The method of claim 12, further comprising, at the group leader:
   transmitting a joining response message comprising an affirmative or negative response to the joining request message.

14. The method of claim 13, wherein the joining response message comprises the affirmative response, and wherein the joining response message further comprises group position information for the wireless communication device.

15. The method of claim 12, wherein the query message comprises a broadcast message, and wherein the invitation message comprises a unicast message directed to the wireless communication device.

16. The method of claim 15, wherein the joining request message comprises a unicast message directed to the group leader.

17. The method of claim 12, wherein the receiving the query message comprises receiving the query message two or more times utilizing two or more different wireless resources.

18. The method of claim 12, wherein the query message is scrambled utilizing a scrambling sequence, the scrambling sequence being one of a randomly selected scrambling sequence or a device-specific scrambling sequence.

19. The method of claim 12, wherein the query message further comprises an indication whether the wireless communication device is part of a second group seeking to join with the group.

20. The method of claim 12, wherein the wireless communication device is a member of a second group, and wherein the identifier comprises a second group identifier.

21. The method of claim 12, wherein the group comprises a vehicle platoon.

22. A wireless communication device comprising:
one or more processors;
one or more memories communicatively coupled to the one or more processors; and
wherein the one or more processors are configured to:
transmit, utilizing a wireless resource, a query message comprising an identifier and course information;
receive an invitation message comprising a first group identifier, first group course information, and wireless resource information for joining a first group, wherein the wireless resource information is based at least in part on the query message and a fixed shifting of time and/or frequency relative to the wireless resource utilized for transmitting the query message; and
transmit a joining request message comprising the first group identifier.

23. A wireless communication device comprising:
one or more processors;
one or more memories communicatively coupled to the one or more processors; and
wherein the one or more processors are configured to:
receive, utilizing a wireless resource, a query message from a joining device, comprising an identifier and course information;
determine to invite the joining device to join a group;
transmit an invitation message comprising a group identifier, group course information, and wireless resource information for joining the group, wherein the wireless resource information is based at least in part on the query message and a fixed shifting of time and/or frequency relative to the wireless resource as utilized for transmitting the query message; and
receive a joining request message from the joining device, comprising the group identifier.

\* \* \* \* \*